April 9, 1935. D. A. RICKEL 1,997,120
HAY GATHERING AND BALING APPARATUS
Filed Sept. 1, 1931   4 Sheets-Sheet 4
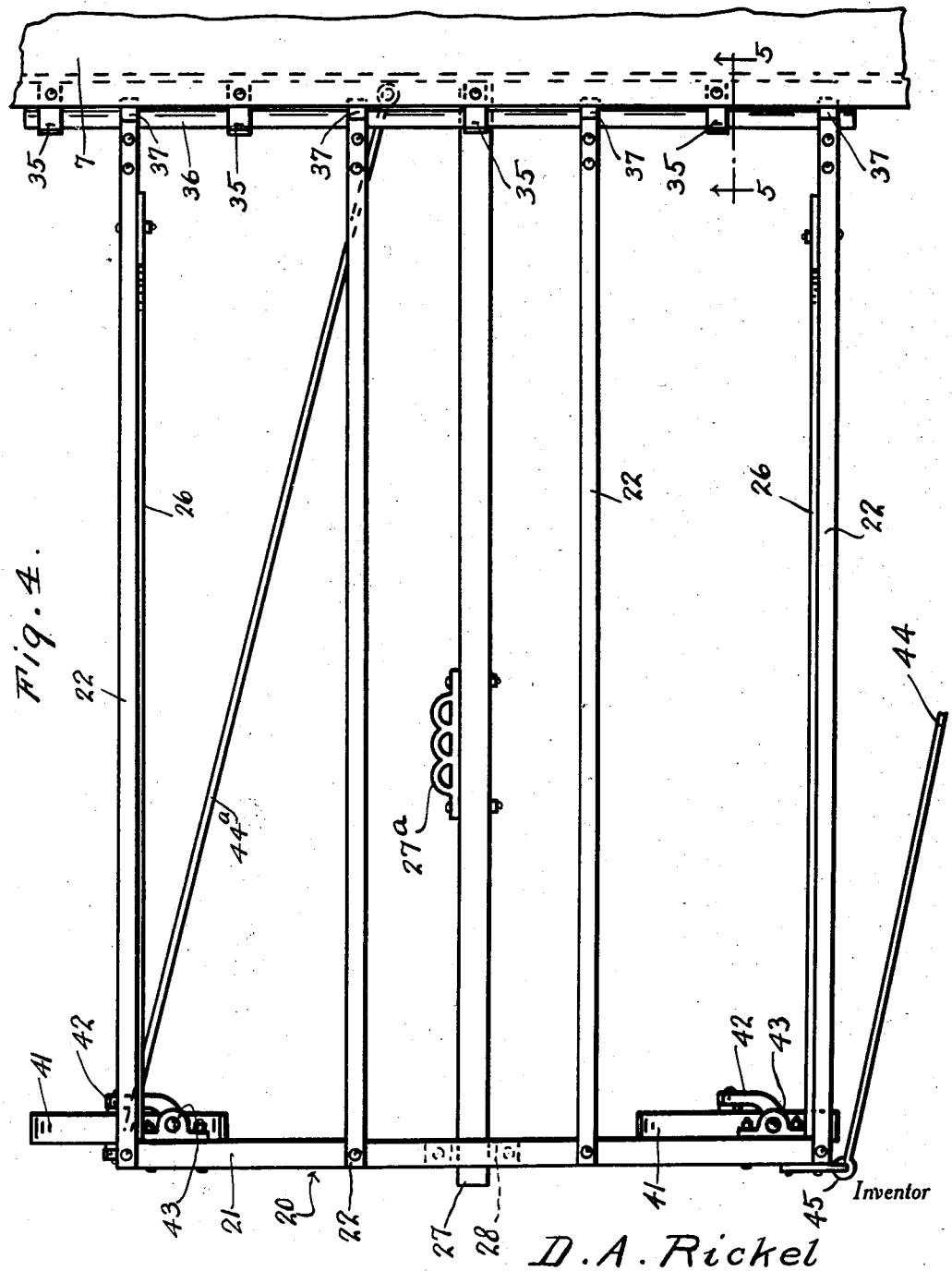

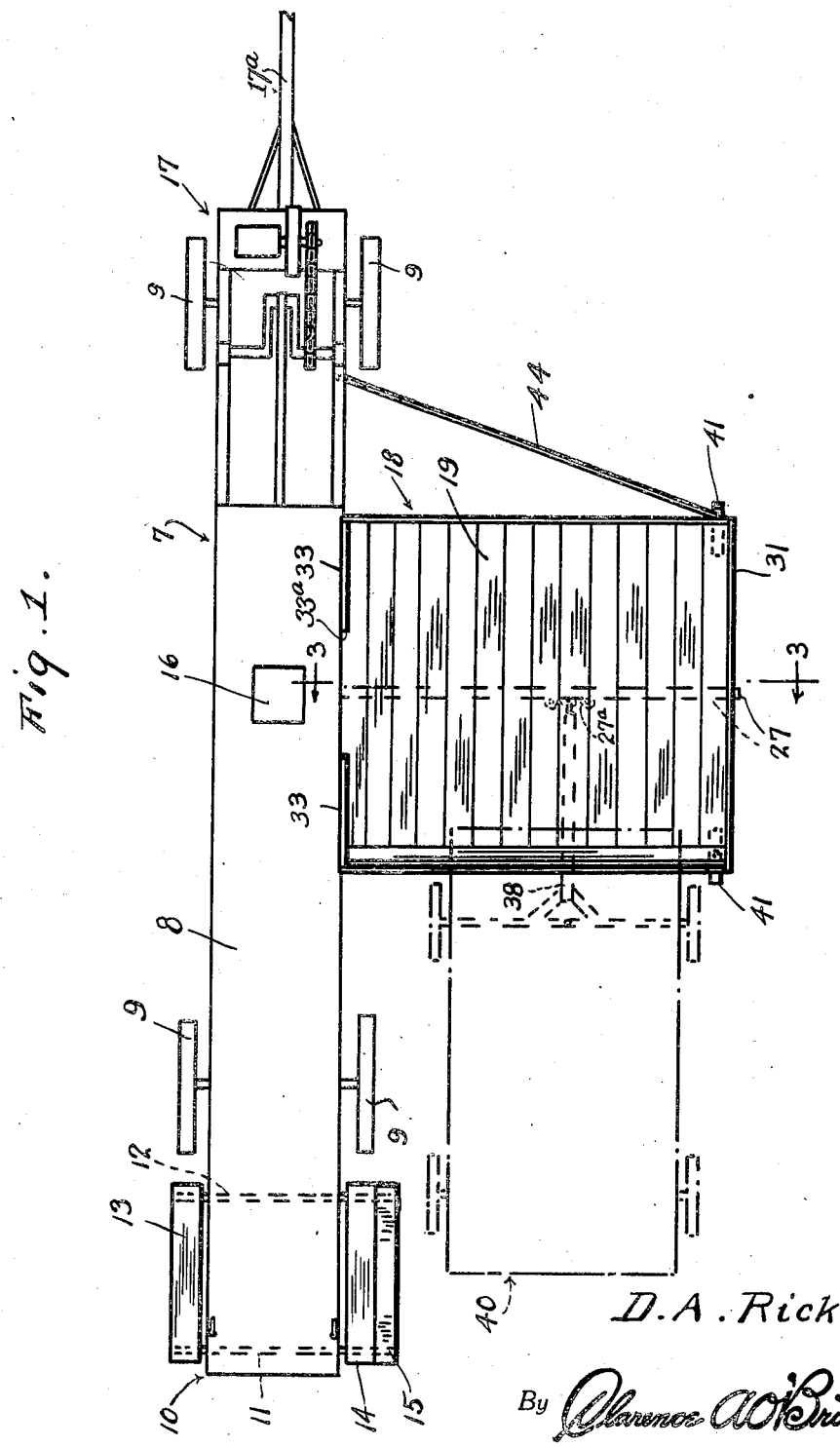

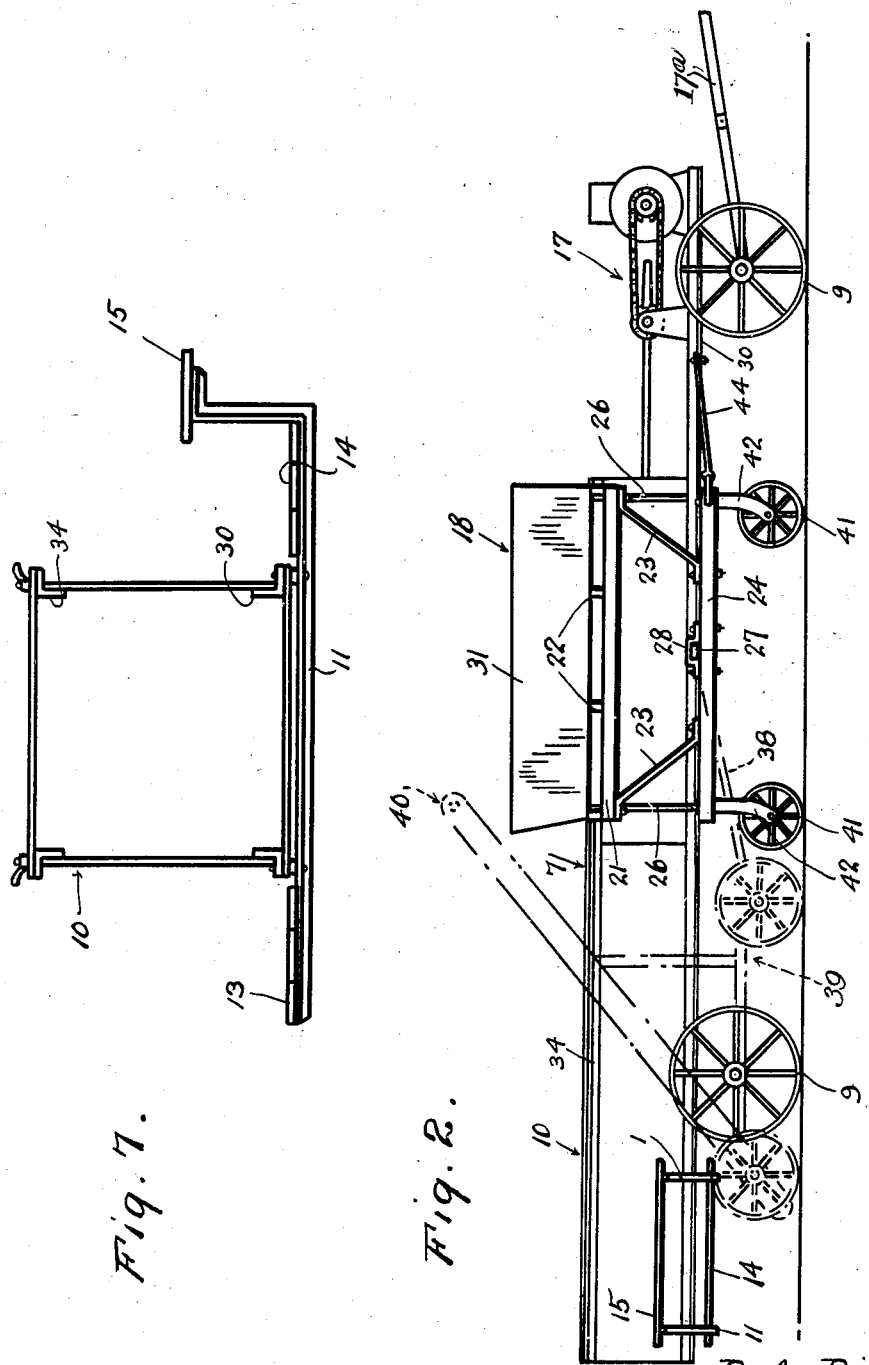

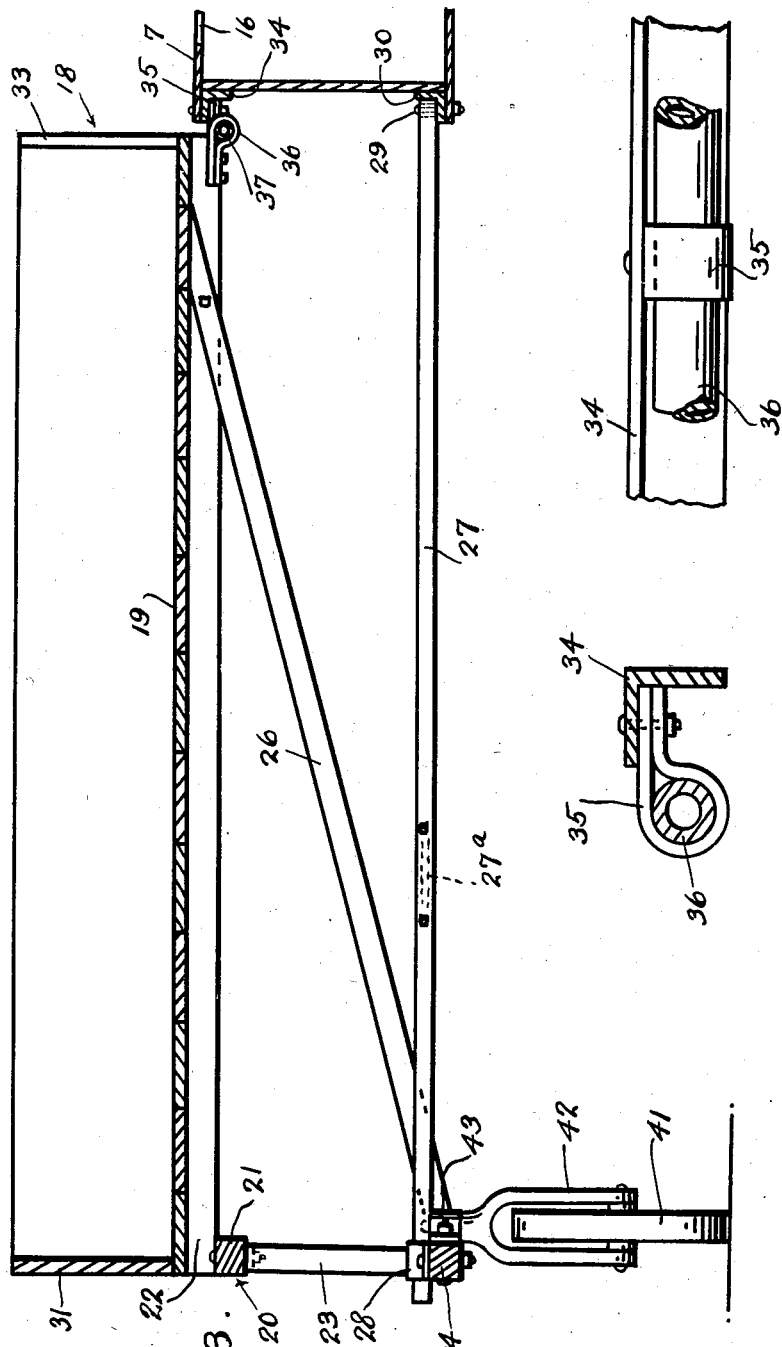

Patented Apr. 9, 1935

1,997,120

UNITED STATES PATENT OFFICE 1,997,120

HAY GATHERING AND BALING APPARATUS

Daniel A. Rickel, Republic, Kans.

Application September 1, 1931, Serial No. 560,671

3 Claims. (Cl. 100—25)

This invention relates to the broad class of farm machinery, and has more particular reference to hay handling units.

My principal aim is to provide an efficient and dependable apparatus affording the requisite concentration of machinery designed to facilitate systematic gathering, loading, separating, feeding, baling, and discharging of the baled hay.

Stated otherwise, I have developed an assembly of appropriately selected and located appurtenances combined into a single portable unit for economically and quickly gathering, handling and baling hay in the field.

The structural features and advantages of my invention will be apparent from the following description in connection with drawings.

In the drawings:

Figure 1 is a top plan view of the unit showing the general assembly of the elements thereof.

Figure 2 is a side elevation of the structure depicted in Figure 1.

Figure 3 is a transverse vertical sectional view through the loading platform taken approximately on the line 3—3 of Figure 1.

Figure 4 is a plan view of the frame structure of the loading platform.

Figure 5 is a transverse vertical sectional view taken on the line 5—5 of Figure 4.

Figure 6 is an elevational view of the structure shown in Figure 5 taken at 90° therefrom, and, Figure 7 is a rear end elevational view of the baling press structure.

The numeral 7 designates generally the hay baling press. This embodies the usual longitudinally elongated casing 8, and ground engaging wheels 9. At the rear of the structure and designated by the numerals 11 and 12 are bars fastened thereunder which carry running boards 13 and 14. One side of the bars 11 and 12 is upwardly and laterally extended to support an attendant's seat 15. The running boards and seat accommodate two or more attendants at the delivery end of the baling press, one attendant for blocking, and the other for wire tying and bale completion work.

Adjacent the front end, the baling press is provided with the usual intake hopper 16. Mounted to the front end of the press is a suitable power operating device 17. A tractor (not shown) is connected to the draft means 17a and is operatively connected to the power operating device 17 in any suitable manner for operating the baling press.

The numeral 18 designates generally the primary element of the structure of the invention. This is in the nature of an attachment which may be broadly referred to as a hay loading platform. The floor of the platform which is indicated by the numeral 19 is supported on a suitable frame structure such as is illustrated in Figure 4. A wall 31 extends on three sides of the floor 19. The fourth side of the floor, namely, that next the baling structure to which the platform is attached, is provided with a wall 33 which is broken at 33a to provide an opening therein opposite the hopper 16 through which the hay to be baled is passed from the platform to the hopper 16.

The frame 20 supporting the platform 18 comprises upper and lower side members 21 and 24, respectively, which are spaced and connected by oppositely angled braces 23 and a plurality of transversely arranged spaced angle bars 22 which are secured at their outward ends upon the upper side member 21 as shown; and diagonal braces 26 which are secured to the front and rear transverse angle bars near their inward end and to the lower side member 24. Secured to the inward side of the lower side member 24 at each end thereof is a caster socket 43 in which is swivelly mounted a caster-wheel structure 42 including a wheel 41 for supporting the outward side of the platform on the ground.

For hingedly supporting the inward side of the platform and securing it to the side of the baling structure, the contiguous side of the baling structure is provided on its upper part with a series of longitudinally spaced loops 35 through which is passed a pipe or round bar 36. The inward end of each transverse angle iron 22 is provided with a similar loop 37 through which the pipe or round bar 36 also passes. By this means the platform is connected to the baling structure so as to be free to swing relative to the press on the axis of the pipe 36 to accommodate different angularities of the ground surface.

The numeral 44 designates a tie bar which extends between the power unit 17 and a bracket 45 attached to the forward end of the lower side member 24 of the platform frame. A rear tie bar 44a extends between the lower part of the baling structure and the rear end of the lower side member 24. These tie bars adequately brace the platform frame against the strains of forward movement of the unit over the ground during operation thereof. The connections at either end of the tie bars are sufficiently free to permit the angular rise and fall of the platform above alluded to.

The apparatus of the invention includes means in the form of a conventional loader 39 for loading hay onto the platform 18, from which the hay is worked by hand into the hopper 16. The loader 39 has its draw bar 38 connected to the platform frame in such a way that it follows behind the loading platform 18 and is free to swing relative thereto when a turn is being negotiated. In this position the conveyor 40 of the loader extends over the loading platform.

For connecting the draw bar 38 of the loader, the frame 20 of the loading platform 18 is provided with a cross member 27 which has its inner end loosely connected by means of a pin 29 which traverses the said inward end of the cross member 27 and a lower flanged part 30 of the baling structure. At its outward end the cross member 27 passes slidably through a strap bracket 28 and is confined thereby so as to slidably rest upon the lower side member 24. The rear side of an intermediate portion of the cross member 27 has attached thereto a bracket 27a having transversely spaced means adapted to be selectively engaged by coupling means used for loosely and pivotally connecting thereto the forward end portion of the loader draw bar 38.

It is evident that the novel assembly of structure herein illustrated and described is characterized by a conventional wheeled hay press having draft means at the front, means for accommodating operators at the rear end thereof, hay loading means, and a loading platform structure to receive the hay from the loader, whence it is conveyed by hand, by workers from the platform into the baling press. This arrangement, it will be admitted, constitutes a practical mechanical ensemble such as will facilitate and expedite the loading and baling of hay in the field.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. An auxiliary loading platform for a mobile power operated baling machine, said platform comprising a frame, caster wheels supporting the outward side of the frame, a floor supported by the frame, hinge members on the inward side of the frame for connection to the adjacent side of the baling machine whereby said floor is supported on a level facilitating transfer of hay to the baling machine, and hay-loading machine connection means comprising a cross member pivotally connectible at one end to the hay baling machine, and slidably connected at its other end to an outward part of said frame.

2. An auxiliary loading platform for a mobile baling machine, said platform comprising a horizontal floor, a frame supporting said floor, longitudinally distributed hinge means on the inward side of said frame enabling hingedly connecting said frame to one side of the baling machine so as to be supported by said machine, ground engaging caster wheels depending from the outward side of said frame and supporting said outward side, a transverse beam having a portion slidably engaged with said outward side of the frame, and means loosely pivoting an inward portion of said transverse beam to the said side of the baling machine, said transverse beam affording means to connect a mobile loading machine so as to be drawn behind said platform.

3. An auxiliary platform for a mobile baling machine, said platform comprising a horizontal floor, a frame upon which the floor rests, said frame including an outer upper and an outer lower longitudinal member, means vertically spacing said members, cross members connected to said upper member and extending inwardly, hinge means on the inner end portion of said cross members adapted to be connected to said baling machine whereby to support the inner end of said platform, caster wheels depending from said outer lower longitudinal member and supporting the outer side of said platform, and a transverse beam having an inner portion loosely pivotally connected to said baling machine, an outer portion of said beam resting on and being slidably connected to said lower outer longitudinal member, said beam afforded means to connect a loading machine to draw the same behind said platform.

DANIEL A. RICKEL.